July 12, 1966     D. G. WOELFEL     3,260,564
AUTOMATICALLY THREADED FILM APPARATUS
Filed March 26, 1963     6 Sheets-Sheet 1

Donald G. Woelfel
INVENTOR

BY Jacoby & Davidson
ATTORNEYS

July 12, 1966          D. G. WOELFEL          3,260,564
AUTOMATICALLY THREADED FILM APPARATUS
Filed March 26, 1963          6 Sheets-Sheet 2
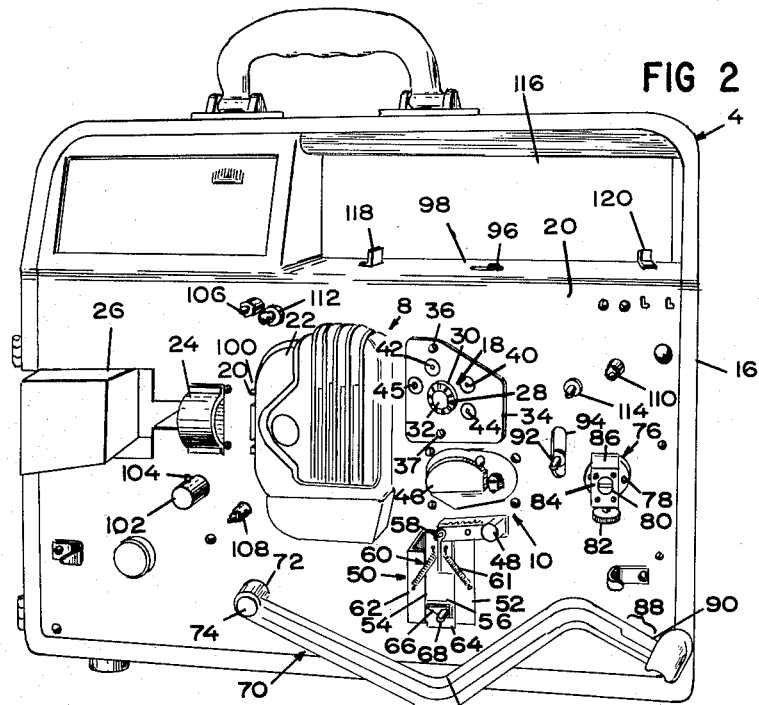
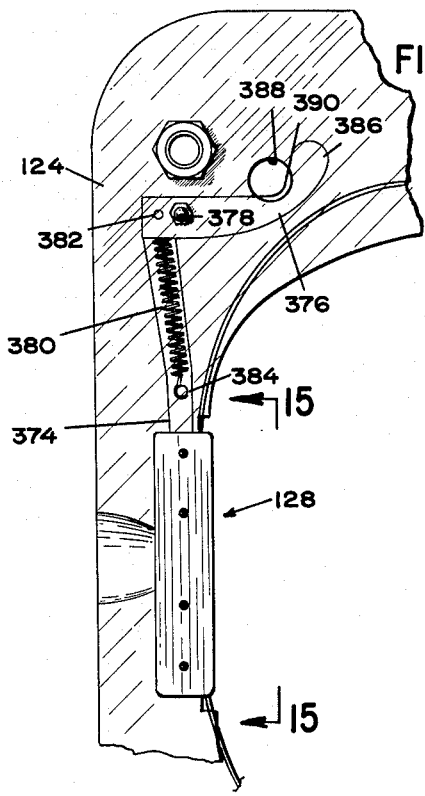
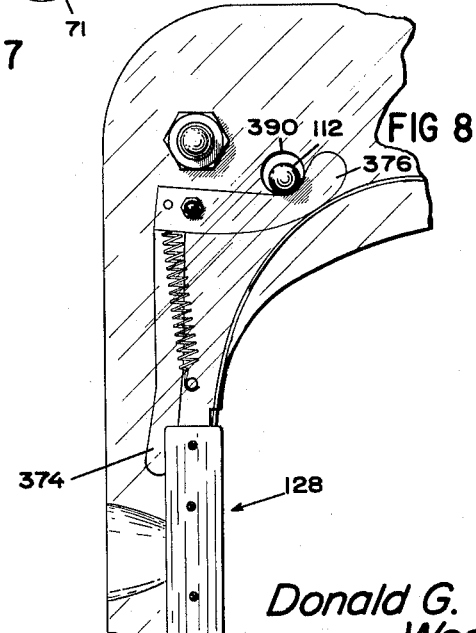
Donald G. Woelfel
INVENTOR
BY Jacobi & Davidson
ATTORNEYS

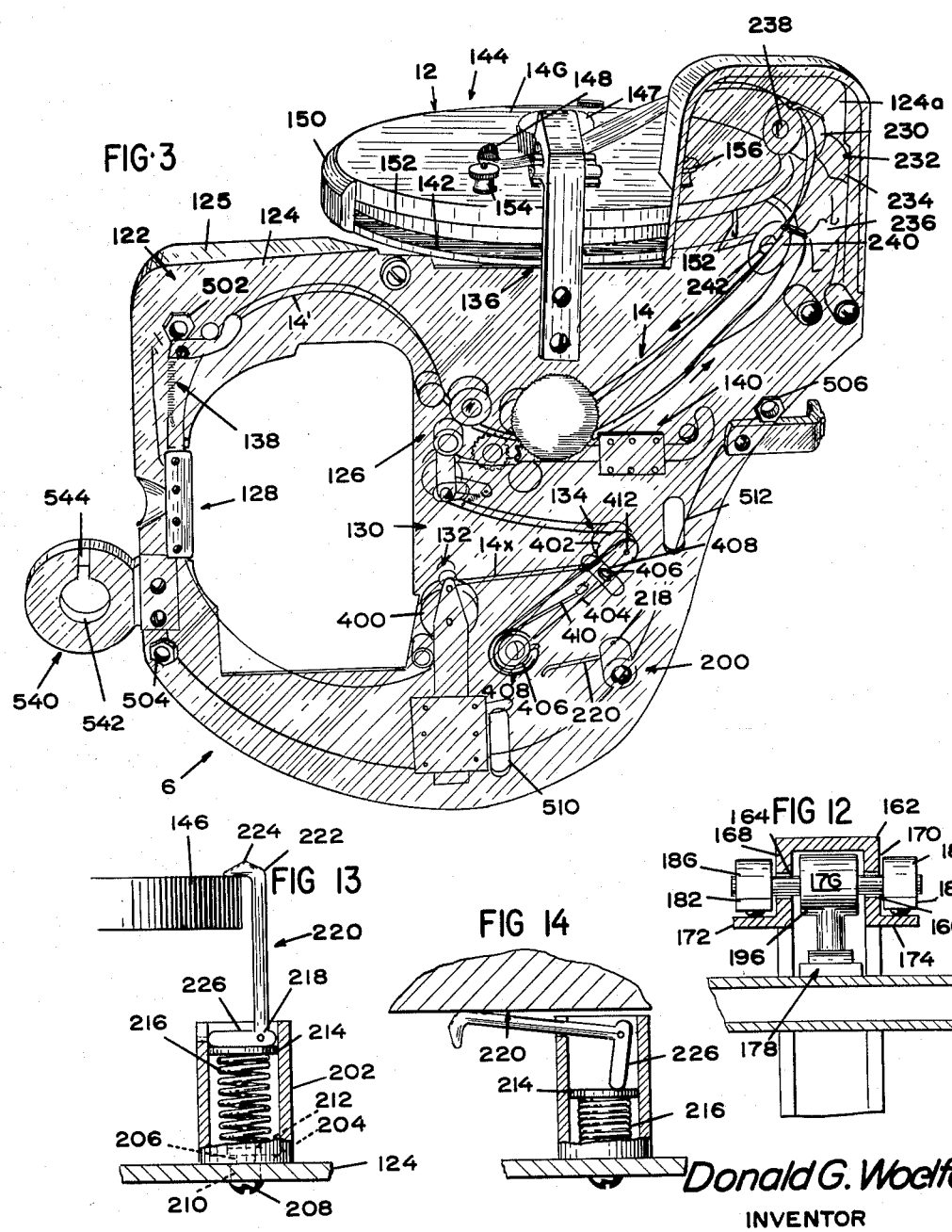

July 12, 1966  D. G. WOELFEL  3,260,564
AUTOMATICALLY THREADED FILM APPARATUS
Filed March 26, 1963  6 Sheets-Sheet 4
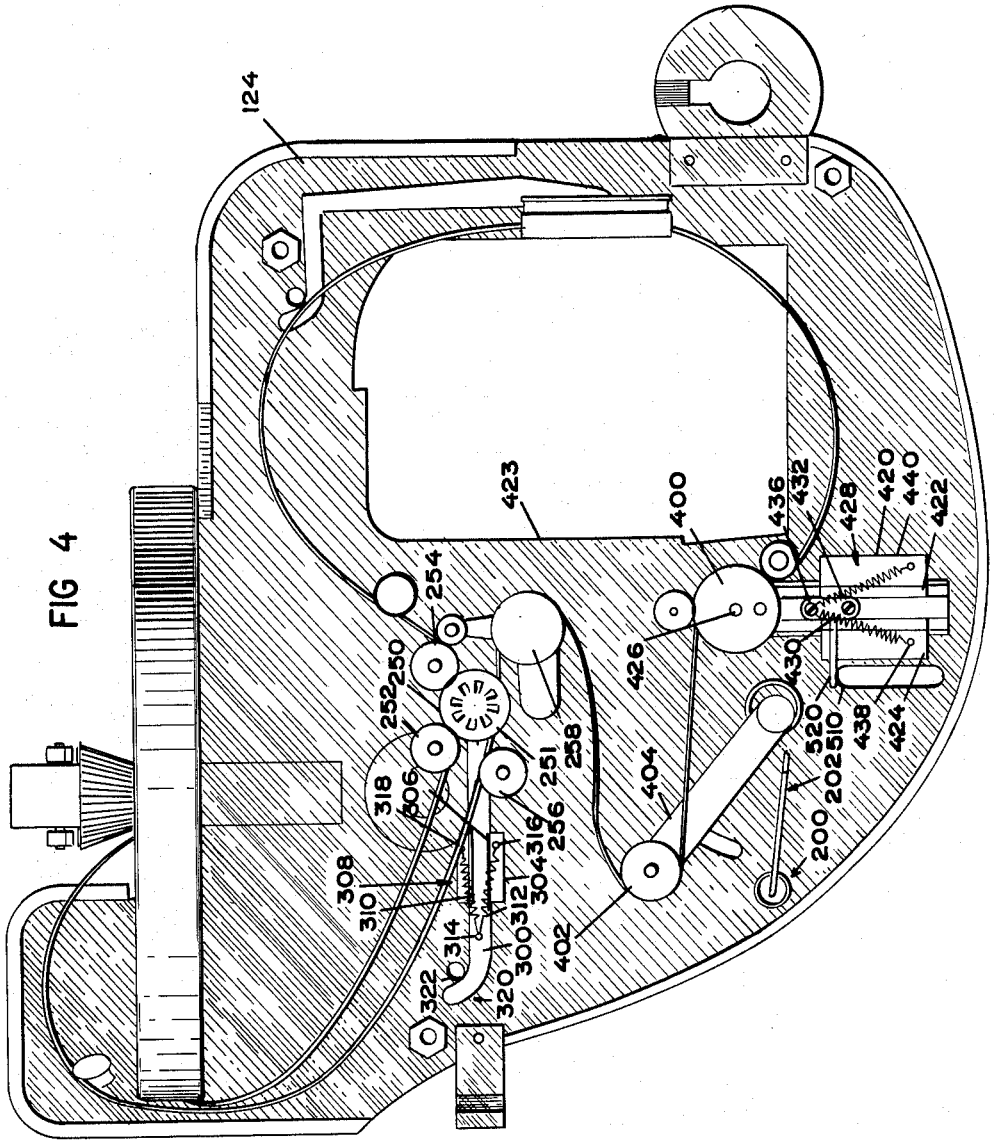
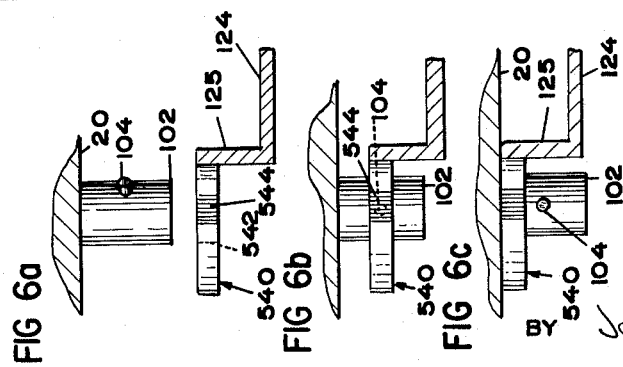
Donald G.
Woelfel
INVENTOR
BY Jacobi & Davidson
ATTORNEYS July 12, 1966 D. G. WOELFEL 3,260,564
AUTOMATICALLY THREADED FILM APPARATUS
Filed March 26, 1963 6 Sheets-Sheet 5
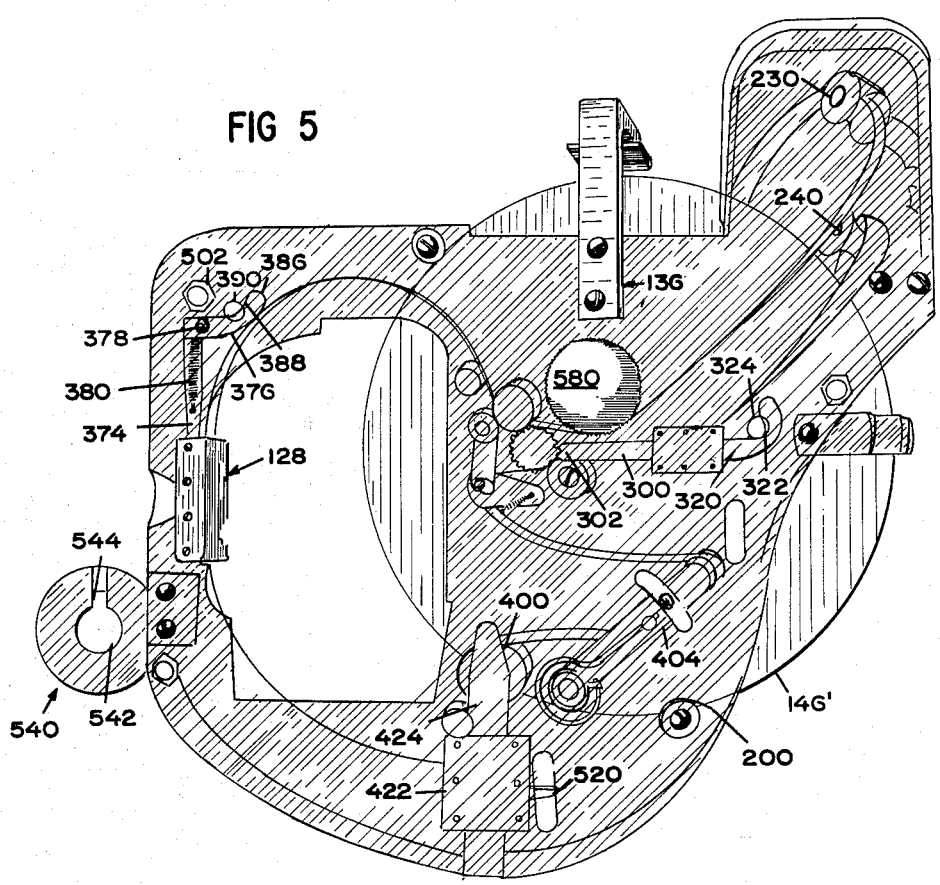
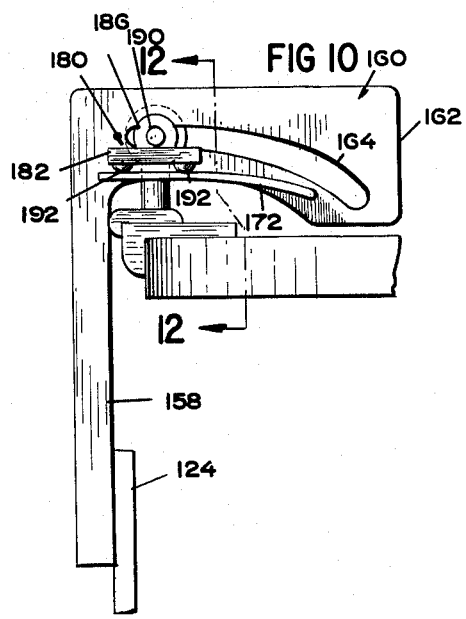
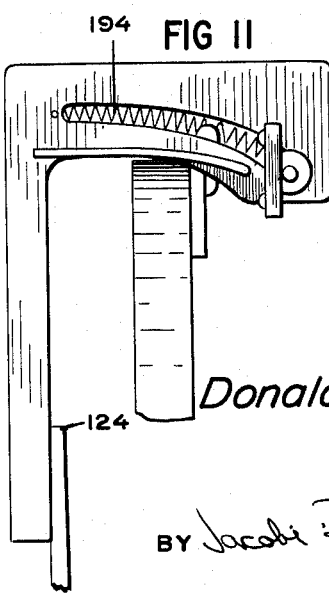
Donald G. Woelfel
INVENTOR
BY Jacobi & Davidson
ATTORNEYS July 12, 1966  D. G. WOELFEL  3,260,564
AUTOMATICALLY THREADED FILM APPARATUS
Filed March 26, 1963  6 Sheets-Sheet 6
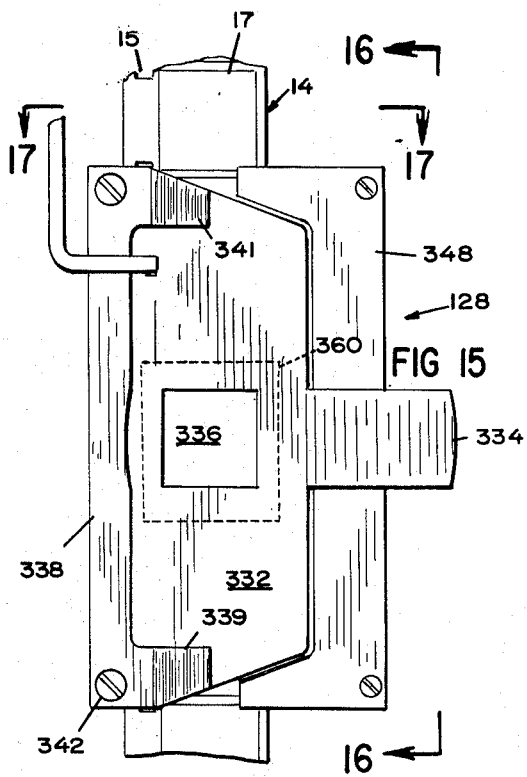
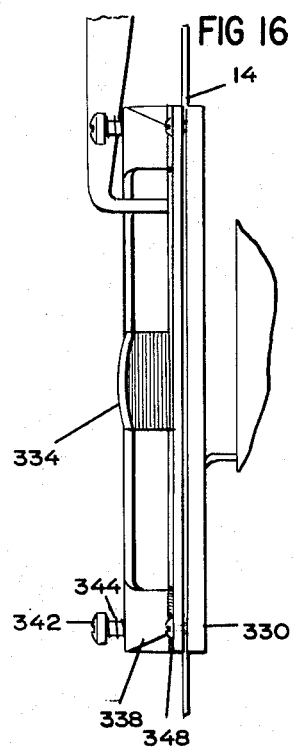
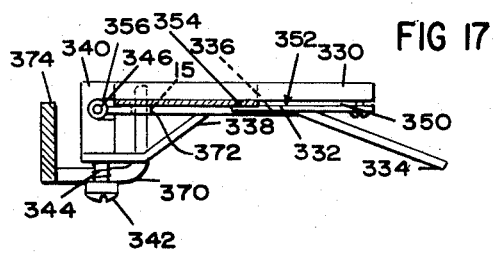
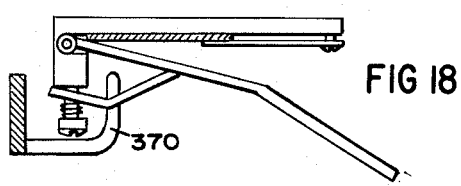
Donald G. Woelfel
INVENTOR
BY Jacobi & Davidson
ATTORNEYS

3,260,564
AUTOMATICALLY THREADED FILM APPARATUS
Donald G. Woelfel, Yorktown Heights, N.Y., assignor to MPO Videotronics, Inc., New York, N.Y., a corporation of New York
Filed Mar. 26, 1963, Ser. No. 268,532
6 Claims. (Cl. 352—72)

This invention relates to automatic threaded film apparatus, and finds particular utility when applied to motion picture apparatus.

Various types of motion picture apparatus adapted to controllably feed a film therethrough for visual and/or sound reproduction of the recorded media on the film have heretofore been provided. Conventionally, such equipment includes a light projection station and a sound reproducing station, each of which stations is adapted to receive a film and reproduce, respectively, a visual display and a sound recording. Moreover, the conventional apparatus incorporates a series of guides and rollers past which the film must be fed for proper guiding in a predetermined path to and from the projection station and the sound reproducing station.

In the use of the ordinary film supply comprising a roll of film, a length of film from the supply is fed over the rollers and the guides manually and then passed, for example, to a take-up reel. This operation requires considerable time and manual dexterity, and, moreover, once a given film supply has been used, the same must be rewound on the initial supply roll to restore it to initial condition for future use.

There have been suggestions as to the provision of an automatic threading device for use with motion picture apparatus which eliminates, at least partially, the manipulations required to feed the film through and over the guides and rollers, but in this instance, the basic apparatus must incorporate additional means and elements thereby substantially increasing the cost thereof. Moreover, even with the automatic threading assemblies, there still must be a re-winding of the film for future use, and thus, there is a lost time factor in using such apparatus, aside from the increased expense resulting from the additional means and components necessarily incorporated therein.

Appreciating the foregoing, it has previously been suggested also that an endless film magazine be provided for use with motion picture apparatus. Such endless film magazine has a returning loop extending therefrom, which loop can be passed over guides and rollers for proper travel through the motion picture apparatus. With the endless film type arrangement, there is no need for re-winding, because the film travels essentially in a continuous path. Still with this arrangement, it is necessary to initially manipulate the film over the guides and rollers as each magazine is operatively associated with a particular motion picture apparatus. Thus, even in this instance, there is substantial time lost in changing from one magazine to another, and the operator must have good manipulating ability to properly "thread" the film.

Notwithstanding the time problems faced with prior endless film supply arrangements, such arrangements have found somewhat widespread use in industrial circles and, particularly by salesmen and other individuals desiring to present a subject pictorially in connection with sound, or simply desiring to play a sound tape for descriptive or other purposes. Still, if the particular subject matter in question cannot be stored or recorded on a single coil of film or tape, then it becomes necessary to change coils or tapes, and as indicated above, this has presented a serious problem, because even though the endless film type magazine eliminated the re-winding problem, it still required the manual threading and looping of film through the projection means and/or recording and playback means of the apparatus with each tape or film change.

The present invention is directed to the provision of an assembly which is free of all of the aforesaid disadvantages, and which conveniently permits the selective change from one endless film supply to another with a given motion picture apparatus. More specifically, it is an object of the present invention to provide a projection apparatus and a pre-threaded film support and supply adapted to be detachably associated with the projection apparatus conveniently, whereby a plurality of different films can be associated with a plurality of detachable pre-threaded film supports so that an operator can conveniently change from film to film by merely coupling the desired film as pre-threaded in its associated film support to a basic projection apparatus.

More generally, it is an important object of the present invention to provide a pre-threaded film supporting device which avoids the aforesaid manual operations now associated with endless film supplies, and which, when coupled with endless film magazines, makes continuous operation and/or interchange of film coil or tape an extremely fool-proof and simple operation requiring little skill or dexterity. While an endless film magazine is conveniently usable in accordance with the invention, it is to be understood that any endless film-type supply can be used in accordance with the basic embodiments hereof, and it further is to be understood that the invention can be applied, in certain instances, if desired, to various and diverse types of film supplies, whether endless or not.

Additional, yet further specific general objects of the present invention include: (a) the provision of a base projection apparatus and of a pre-threaded film support adapted to be detachably coupled therewith, wherein the projection apparatus includes both light projecting means and sound reproducing means, and wherein the pre-threaded film support carries guide means thereon for maintaining the film in a pre-determined position for automatic operative positioning thereof with respect to the light projection means and sound reproducing means of the projection apparatus; (b) the provision of such an assembly wherein the detachable pre-threaded film support carries thereon means for storing and transporting the film whereby the same is instantly ready for use, and whereby the same is so packaged and cooperatively associated as to permit the convenient storage and assembly of the support and film supply; (c) the provision of such an assembly wherein the projection apparatus and pre-threaded film support have cooperating means thereon for aligning the pre-threaded film support automatically for operative association with the projection apparatus and for preventing the alignment and operative association of the pre-threaded film support unless and until the components of the projection apparatus are properly positioned to receive the film without damaging the same; (d) the provision of such an assembly wherein the pre-threaded film support and projection apparatus carry operating members thereon that are simultaneously activated by movement of a single handle so as to render the ultimate assembly automatically operative with movement of the handle to an operating position; (e) the provision of such an assembly wherein the pre-threaded film support includes means thereon for fixing the film carried thereby in a pre-determined path thereby pre-setting the film in a prescribed relation for automatic proper synchronization of visual and audio reproduction; and, (f) the provision of such an assembly which can be comparatively inexpensively manufactured so as to be commercially practical for widespread use.

Aside from the preceding general objects, the invention has certain important and significant detailed objects.

These include the following: (1) the provision of a projection apparatus adapted to be associated with a detachable pre-threaded film supporting device, which projection apparatus incorporates in addition to drive means, and light projection means, a sound reproducing means comprising at least two separable elements, at least one of which is movable from a first position where the elements are separated, to a second position where a film is engageable therebetween for reproduction of sound therefrom; (2) the provision of such an apparatus which includes a drive connection exposed to one face thereof for detachable cooperative association with a drive means or member engaging the film and carried by the pre-threaded film support; (3) the provision of such a projection apparatus which includes a film advancing claw and an alignment means or member driven synchronously therewith and having an alignment projection thereon which can be used in operative association with the pre-threaded film support to prevent assembly of the pre-threaded film support with the projection apparatus unless the film-advancing claw is in a retracted position out of the path of movement of the film so as to prevent damage to the film by the film advancing claw during the initial coupling of the pre-threaded film support to the projection apparatus; (4) the provision of such an apparatus which has an operating finger member associated with the drive means thereof for activation of the drive means through movement of the operating finger member and wherein the operating finger member projects from the apparatus whereby to be engageable by an operating handle for movement thereby; and, (5) the provision of such an apparatus wherein the light projecting means, the sound reproducing means, the drive connection, the film advancing claw, and the operating finger member are all exposed on one face thereof whereby a pre-threaded film support can be coupled in a pre-determined position on such apparatus in over-lying relation to such face for cooperative association of elements on said pre-threaded film support with elements on said face of said apparatus.

With respect to the pre-threaded film support provided hereby, the invention has even further specific objects, including the following: (1) the provision of a pre-threaded film support having sprocket drive means thereon adapted to be operatively associated with a drive connection on a projection apparatus, and engaging spaced portions of a film loop carried by the pre-threaded film support whereby to maintain a given length of the film in extended relation past the sprocket means; (2) the provision of such a pre-threaded film support which further includes means for releasably locking the sprocket means in a given position; (3) the provision of such a pre-threaded film support having thereon film gate means through which a portion of the film travels, and wherein the film gate means is positioned on the pre-threaded film support for disposition immediately in advance of the light projecting means when the pre-threaded film support is operatively associated with a projection apparatus; (4) the provision of such a pre-threaded film support which further includes a releasable locking means for engaging the film passing through the film gate means to thereby maintain the same in fixed position in the film gate means, and in turn, to fix a pre-determined length of film between the sprocket means and the film gate means; (5) the provision of such a pre-threaded film support which further includes a pair of spaced guides adapted to maintain a length of film freely suspended therebetween, and wherein the guides are positioned to direct the film suspended therebetween in proper location intermediate spaced elements of a sound reproducing means such that the sound reproducing elements can thereafter be brought into cooperative engagement with the film engagingly passing therebetween; (6) the provision of such a pre-threaded film support wherein the guides are movably mounted for positioning the film initially for receipt between the separable elements of the sound-reproducing means, and for thereafter properly guiding the film therethrough; and, (7) the provision of such a pre-threaded film support which further includes a bracket means for maintaining a film supply in lateral relation thereto when the support is operatively associated with a projection apparatus, and for permitting the folding of the film supply to a position generally parallel to the support when the support and film supply are not in use.

Notwithstanding the specific objects related to the projection apparatus and to the pre-threaded film support hereof, as outlined above, the invention has certain specific objects related to the combination of the projection apparatus and pre-threaded film support. Specifically, these objects include the following: (1) the provision of a combination projection apparatus and pre-threaded film support conforming with the preceding objects, and wherein the projection apparatus and pre-threaded film support carry cooperating means for releasably fixing the film support in pre-determined position on the projection apparatus: (2) the provision of such a combination wherein the projection apparatus and pre-threaded film support carry cooperating means thereon which automatically cooperate with locking means on the pre-threaded film support to release the elements on such support fixed in position by the locking means, when the pre-threaded film support is located in a given position on the projection apparatus; (3) the provision of such a combination wherein operating elements on the projection apparatus and on the pre-threaded film support which are movable to operating positions carry projecting operating fingers thereon which extend in and through a common plane, and wherein an operating handle is provided on the projection apparatus and movable through said common plane for automatically moving such operating fingers and thereby their associated elements to operative position.

The invention lies in certain combinations, subcombinations, arrangements and assemblies, and will be better understood when consideration is given to the following detailed description. Such description refers to the illustrative and preferred embodiments of the invention presented in the annexed drawings, wherein:

FIGURE 2 is a front elevational view of the projection apparatus shown in FIGURE 1, presenting such apparatus alone, and as the same would appear before association therewith of a pre-threaded film support;

FIGURE 3 is a front elevational view of a pre-threaded film support constructed in accordance herewith, such figure showing the component means thereof in the positions which they occupy when such support is co-operatively associated with a projection apparatus such as shown in FIGURE 2;

FIGURE 4 is a rear elevational view of the pre-threaded film support shown in FIGURE 3;

FIGURE 5 is a front elevational view of the pre-threaded film support shown in FIGURE 3, but presenting the component means thereof in the positions which they occupy when the pre-threaded film support is not co-operatively associated with a projection apparatus, and when the same is in condition for handling and transportation;

Figure 9:
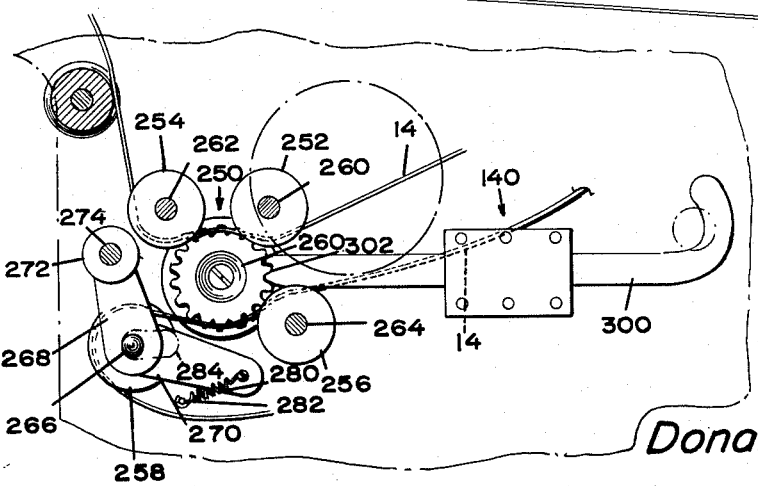

FIGURES 6(A), 6(B) and 6(C) are fragmental detailed views showing the construction and operation of cooperating means carried by the projection apparatus and pre-threaded film support for preventing operative association of the pre-threaded film support with the projection apparatus when the film advancing claw of the projection apparatus is in an advanced position;

FIGURE 7 is a fragmental side view of a film gate means and film locking means associated therewith and carried by the pre-threaded film support for locking film in the film gate means, FIGURE 7 showing such means in a position where the film is locked in the film gate means;

FIGURE 8 is a fragmental side view, similar to FIGURE 7, but showing the film locking means of FIGURE 7 in the position it occupies when film is free to travel through the film gate means;

FIGURE 9 is a fragmental detailed side view taken from the same side of the pre-threaded film support as FIGURE 3, FIGURE 9 showing the preferred construction of the drive means carried by the pre-threaded film support constructed in accordance herewith, and the detailed construction of the locking means preferably associated with the drive means for maintaining the same in a given position;

FIGURE 10 is a fragmental detailed side view of a bracket unit constructed in accordance herewith for selectively supporting an endless film supply in operative and collapsed positions with respect to the pre-threaded film support, FIGURE 10 showing the elements of the bracket unit in the positions they occupy when the film supply is in the operative position;

FIGURE 11 is a detailed fragmental side view similar to FIGURE 10, but showing the elements of the bracket unit in the positions which they occupy when the film supply is in the collapsed position thereof;

FIGURE 12 is a sectional view taken on the line 12—12 of FIGURE 10 and showing the preferred detailed construction of a cooperating trackway and carriage assembly forming part of a bracket unit constructed in accordance herewith;

FIGURE 13 is a fragmental sectional view of a portion of the pre-threaded film support showing a latching means carried thereby for fixing the film supply in collapsed relation to the pre-threaded film support, FIGURE 13 presenting the latching means elements in the operative position thereof;

FIGURE 14 is a fragmental detailed sectional view similar to FIGURE 13, but presenting the latching means elements in the collapsed and inoperative position thereof;

FIGURE 15 is a front view of a film gate means constructed in accordance herewith, as carried on the pre-threaded film support;

FIGURE 16 is a side view taken on the line 16—16 of FIGURE 15, and showing certain constructural details of the film gate means and locking means associated therewith;

FIGURE 17 is a transverse end view taken on the line 17—17 of FIGURE 15, and showing one end portion of the film gate means and associated film locking means, FIGURE 17 presenting the components when the film is locked in the film gate means; and, FIGURE 18 is a transverse end view similar to FIGURE 17, but presenting the components of the film gate means and associated film locking means when the film gate means is open for insertion of film therein, and when the locking means is in its released position.

Figure 1:
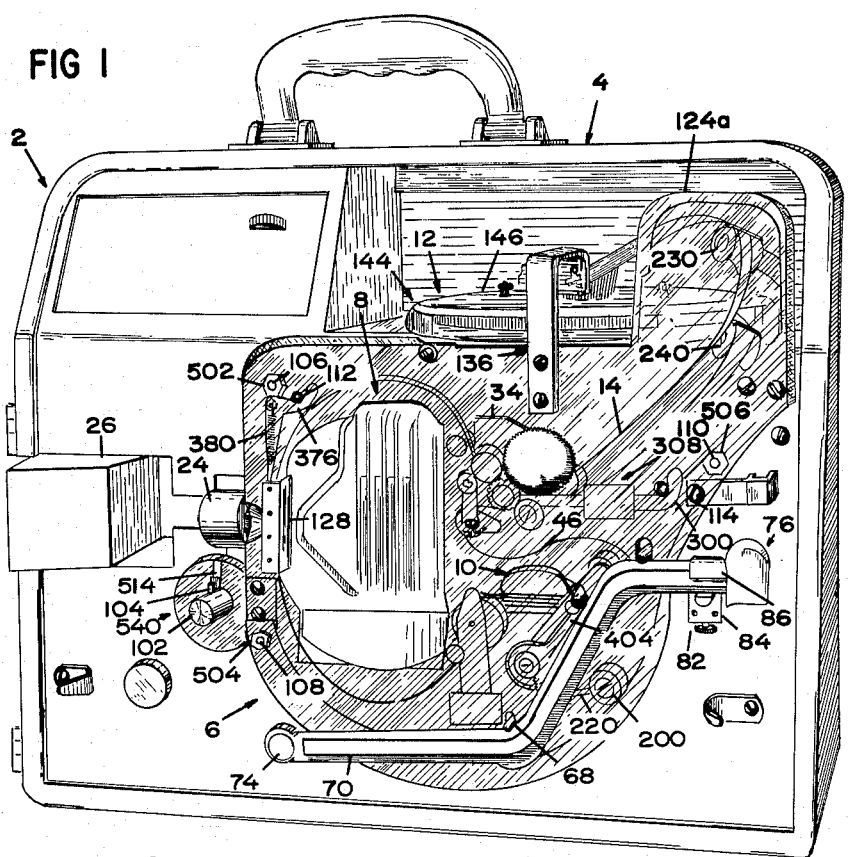
FIGURE 1 is a front elevational view of a projection apparatus and pre-threaded film support constructed in accordance with the present invention, and presenting the same as they appear in cooperative association in accordance herewith.

Referring now more particularly to the drawings, in FIGURE 1 the overall cooperative assembly provided hereby is shown therein and generally designated by the numeral 2. Such assembly includes a projection apparatus generally designated by the numeral 4, and a pre-threaded film support means generally designated by the numeral 6. The pre-threaded film support 6 carries a film supply 12 and serves to maintain a length of the film, generally designated by numeral 14, in a predetermined path.

The pre-threaded film support means 6 is detachably coupled to the projection apparatus 4, but when the pre-threaded film support means 6 is positioned on the projection apparatus 4 as shown in FIGURE 1, then the assembly serves to automatically project a visual display from the film and simultaneously produce an audio presentation from the sound media recorded on the film.

While the preferred construction of the various means and components incorporated on the projection apparatus and the pre-threaded film support means appear in FIGURE 1, a better understanding of the construction of the preferred embodiment thereof can be obtained by initially considering the projection apparatus and pre-threaded film support generally separately. Accordingly, for purposes of clarity and to facilitate description, various aspects of the invention are considered under separate headings below.

PROJECTION APPARATUS

(A) Basic arrangement

In FIGURE 2, a projection apparatus suitably modified in accordance with the invention, is presented by itself. Such apparatus, generally designated by the numeral 4, includes a housing 16, in which housing there is provided a conventional drive means (not shown). The drive means, however, is connected drivingly with a drive connection 18 exposed on the side face 20 of the apparatus 4. Furthermore, the drive means (not shown), but as conventional, serves to drive a film advancing claw 20 between advanced film engaging position and a retracted position free of the film. The film engaging claw, also as conventional, is associated with the light projecting means 8, and projects during its movement from the housing 22 of the light projection means in a plane generally parallel to the forward face 20 of the housing 16.

The light projection means can take any suitable form known in the art, but includes a light source, preferably a lamp, and means for directing light rays from the lamp forwardly of the housing 22 and toward a lens support 24. The lens support 24 is adapted to receive a lens assembly therein whereby the same may be adjusted in the usual manner for focusing purposes. If desired, a reflecting prism or mirror structure 26 can be mounted pivotally in the housing 16 so as to direct the visual display laterally of the housing. As known to those skilled in the art, a lens support and cooperating lens assembly, and a directive prism or mirror, like an enclosed drive means, are conventional parts of a projection apparatus. Insofar as these basic parts or assemblies are concerned, the invention contemplates no change from a standard structure.

(B) Exposed drive connection

However, consistent with the invention, and as indicated above, an exposed drive connection 18 is provided on the same side of the housing as that carrying the standard exposed elements referred to above. This drive connection preferably takes the form of a bevel gear member 28 having teeth 30 thereon, the bevel gear member tapering inwardly away from the face 20 of the housing. The bevel gear member 28 is supported on a shaft 32, which shaft is driven by the drive means (not shown) enclosed within the housing 16.

Preferably, there is associated with the drive connection 18, a plurality of bearing sockets 40, 42, 44 and 45 adapted to receive projecting stub shafts therein, as explained more fully below. For convenience, the bearing sockets 40–45 can be mounted in a plate member 34 which is secured to the face 20 of the housing 16 in any suitable manner such as, for example, by screws 36 and 37.

(C) Sound reproducing means

Another modification which is made to the conventional projecting apparatus consistent with the present invention relates to the structure of the sound reproducing means 10. Consistent herewith, the sound reproducing means 10 includes at least two separable elements 46 and 48, at least one of which elements, namely, element 48 is movable from a first normal position, as shown in FIGURE 2, where the elements are separated, to a second operative position where film is engageable between the elements 46 and 48 for reproduction of sound therefrom. The element 46 of the sound reproducing means, as shown, is preferably fixed and comprises the sound reproducing pick-up head. The element 48 of the sound reproducing means, on the other hand, which is movable as shown, serves to maintain a film in engagement with the pick-up head for proper pick-up therefrom of the sound media carried thereby.

A mounting means 50 is carried on the face 20 of the housing 16, in accordance with the preferred embodiment hereof, for supporting the element 48 for reciprocal movement toward and away from the element 46, thus making the elements separable through a substantial distance, and permitting in the manner explained below, the easy insertion of film between such elements, as separated. The mounting means 50 comprises a support member 52 fixed on the face 20 and having a slideway 54 therein. The slideway 54 can have any internal configuration desired, but preferably is of dove-tail shape. Slidably disposed within the slideway 54 is a slide 56 having a mating configuration with the slideway 54 whereby the slide 56 is freely slideable along a vertical axis as shown, in the support member 52.

The movable element 48 is mounted on the upper end of the slide 56 by any suitable mounting means, but preferably by a pivotal connection 58 which permits slight pivotal movement of the element 48 with respect to the slide 56 and thereby proper aligning between the elements 46 and 48 when the slide 56 moves upwardly so that the elements 46 and 48 are in operative disposition with respect to one another.

In order to maintain the slide 56 and thereby the element 48 in a normal downward position where the element 48 is separated from the element 56, a biasing means 60 is incorporated. Such biasing means preferably includes a pair of springs 61 and 62, each of which springs has its lower ends, as shown, connected to the support member 52, and each of which springs has its upper ends, as shown, connected to the slide 56 whereby to normally exert a downward pull on the slide 56 and urge the same toward its downward position. To limit the downward movement of the slide 56, if desired, there is provided an abutment 64 extending across the base of the slideway 54. The abutment 64 cooperates with a projecting abutment 66 extending outwardly from the slide 56, the maximum downward position of the slide then being determined by the engaging position of abutments 64 and 66.

(D) *Operating handle and latching means therefor*

As will appear more fully below, the invention contemplates simultaneously operating various movable elements of the ultimate unit into operative position by means of a single handle member. To this end, an operating arm or finger member 68 projects outwardly from the slide 56, or specifically as shown, from the abutment 66.

Furthermore, and to the same end, the projection apparatus has mounted thereon an elongate operating handle 70. The handle 70 is pivotally supported at the outer end of a spacer 72 by means of a pivot shaft 74. The handle member 70, as so supported, is movable in a plane extending in parallel spaced relation to the face 20 of the housing 16. The operating arm or finger member 68 projecting from the slide 56 extends through such plane so as to thereby be engageable by the handle member 70 when the same is moved upwardly from its position shown (FIG. 2).

For purposes of maintaining the handle member 70 in a fixed operative position, once the same has moved the various operating arms or finger members in the manner explained more fully below, there is provided on the face 20 of the housing 16 a latching means 76. The latching means 76 shown in FIGURE 2 comprises a base member 78 having a latch member 80 reciprocally mounted therein for movement inwardly and outwardly of the face 20 of the housing 16. The latch member 80 is movable inwardly through pushing on the operating handle 82 thereof and the latch member projects from a face plate 84 having a U-shaped abutment guide 86 at the upper end thereof. Suitable spring means not shown biases the latch member outwardly of face 20. The spacing between the latch member 80 and the abutment end 86 of the face plate 84 is such that portion 88 of the handle 70 is receivable between the latch member 80, as outwardly biased, and the abutment guide 86 when the handle member is moved upwardly with the edge 90 thereof engaging the abutment guide 86.

Notwithstanding the provision of a latching means 76 such as described above, it is to be understood that any suitable latching means can be used in accordance herewith for maintaining the operating handle 70 in a desired operating position. Accordingly, the latching means shown is merely illustrative in all respects.

(E) *Drive means operating finger and associated actuations*

A still further modification of a basic projection apparatus which is made in accordance herewith lies in the provision of an operating arm or finger member coupled with the drive means (not shown) within the housing 16 for actuation thereof. Specifically, an operating arm or operating finger member 92 is mounted on a suitable slide of any design, such as the slide assemblies described below, and extends in projecting relation to the face 20 of the housing 16 and through the plane in which the handle member 70 is movable. The operating finger member 92 is reciprocable within the slot 94 in the side face 20 of housing 16, and upon movement of finger member 92 upwardly from the position shown in FIGURE 2, the same serves to activate the drive means within the housing 16. This activation can be achieved by various conventional techniques. For example, the operating finger member 92 and/or its associated slide can close a microswitch to activate the drive means, or again, by way of example, a mechanical coupling can be provided between such operating finger and its associated slide and the drive means for activation of the drive means.

A drive means of the type here in question can be any one of the types used in projecting apparatus adapted to be associated with endless film magazines, such as disclosed in my prior co-pending application, Serial No. 95,974, filed March 15, 1961, now U.S. Patent No. 3,134,-552. Such drive means incorporate a drive spindle supported in position to be drivingly coupled with a film supply magazine turntable. Such drive spindle commonly projects from an upper face of the projector housing 16, and as shown in FIGURE 2, the spindle 96 extends in projecting relation to the face 98 of the housing 16. The spindle 96 is a conventional magazine drive spindle, and accordingly, further detailed discussion of the operation thereof appears unnecessary. It should be noted, however, that a suitable mechanical link (not shown) of conventional design is preferably incorporated in an apparatus constructed in accordance herewith so that the spindle 96 is movable upwardly with movement of the operating finger or arm member 92. The spindle 96, in essence, forms part of the drive means, and thus, is activated or positioned consistent with the immediately preceding discussion in response to movement of the operating finger or arm member 92 to its activating position.

(F) *Means for pre-setting film advance claw*

Although the drive connection 18 as exposed, and the sound reproducing elements 46 and 48, as separated, are readily adapted to cooperate with a pre-threaded film support and film carried thereby so long as the cooperating elements and film is properly disposed, the film advancing claw 20 referred to above, presents some problem. Specifically, a film advancing claw on a projection apparatus necessarily extends in the path of movement of the film to engage the same and advance it in accordance with conventional techniques. Thus, while a length of film that is properly supported and positioned could readily be inserted between the sound reproducing elements 46 and 48, for example, the same is not the case with respect to positioning of a length of film forward of the light projecting means housing 22 for cooperation with the film advancing claw 20. Specifically, for engagement of the film by the film advancing claw, the film advancing claw must move to an advancing position forward or to the left of the axis 100 as shown in FIGURE 2. Correspondingly, the film in this instance should move in a path along the axis 100. Now, if the film advancing claw 20 is not in the retracted position shown, but instead is extending across the axis 100, then the film cannot readily be placed in a position along the axis 100 for engagement by the film advancing claw because the film advancing claw would prevent such insertion, and in fact, if mispositioned, the claw could damage the film.

In view of the above, the invention contemplates only permitting the insertion or disposition of film carried by the pre-threaded support in initial position for operation when the film advancing claw 20 is retracted. In particular, consistent with the invention, cooperating means are provided on the projection apparatus and on the pre-threaded film support for preventing initial operative positioning of the pre-threaded film support on the projection apparatus unless the film-advancing claw 20 is in its retracted position. One portion of this cooperating means comprises the rotating shaft 102, means supporting such shaft for rotation (not shown) with the end thereof projecting from face 20, and an aligning projection 104 extending radially from shaft 102. The shaft 102 is driven by the drive means (not shown) synchronously with movement of the film advancing claw 20. Any conventional drive connection can be incorporated in the apparatus for rotatably mounting the shaft and for maintaining the synchronous drive whereby one revolution of the shaft 102 corresponds to one complete movement of the film advancing claw 20 through its path of movement from retracted to advance positions and returns.

By virtue of the synchronous movement between the shaft 102 and film advancing claw 20, the alignment projection or pin 104 has a given position corresponding to a retracted position of the film advancing claw. In the preferred embodiment, the aligning pin 104 is located in a position extending vertically upward when the advancing claw is in its retracted position. With this arrangement, regardless of any prior position of the film advancing claw, it is possible for an operator to immediately return the claw to its retracted position by moving the shaft 102 to the position where the aligning pin 104 extends vertically upward. Of course, the drive connection between the shaft 102 and the film advancing claw 20 not only drives the shaft 102, but also permits synchronous drive of tie claw 20 with rotation of the shaft through manual manipulation.

(G) *Coupling and positioning elements*

Aside from the more basic operating components carried by and forming part of the projection apparatus as described above, such apparatus further has thereon means adapted to cooperate with a pre-threaded film support to couple the same in predetermined position on the apparatus, and means for operatively positioning certain elements and assemblies carried by the pre-threaded support. Specifically, alignment coupling pins 106, 108 and 110 project from the face 20 of the projection apparatus 4, and as explained more fully below, these pins are releasably receivable in coupling sockets carried by a pre-threaded film support means constructed in accordance with the preferred embodiment hereof. Similarly, stub shafts or shaft members 112 and 114 project from the face 20 of the apparatus 4 for cooperation with certain releasable locking means carried by the pre-threaded film support. The exact operation and function of the alignment coupling pins and of the stub shaft members can be better understood after the pre-threaded film guide support means has been discussed in detail, and accordingly it is sufficient in this portion of this specification to understand merely that the alignment coupling pins 106–110 and stub shaft members 112 and 114 project outwardly from the face 20 of the apparatus 4 for cooperation with a pre-threaded film supporting device.

(H) *Miscellaneous*

Although the housing 16 has not been described in any detail, it will be readily apparent to those skilled in the art that the same incorporates conventional internal mechanisms consistent with the constructions incorporated in projecting apparatus adapted, for example, for use with endless film magazines as described and disclosed in my prior co-pending application identified more particularly above. One point, however, to note is that the upper face 98 of the housing 16 forms a shelf member extending across the base of the recess area 116. This area is dimensioned to receive an endless film magazine, and for this purpose, guides 118 and 120, can well be provided on face 98 for cooperation with such a magazine in supporting relation thereto.

PRE-THREADED FILM SUPPORTING DEVICE (A) *General basic arrangement*

As indicated in the description of figures set forth above, FIGURE 3, is an elevational view of a pre-threaded film support means constructed in accordance with the invention, and showing the parts and elements thereof in the positions which they occupy when the pre-threaded film support means is operatively associated on and with a projection apparatus such as discussed in detail in the preceding section of this specification.

The pre-threaded film support means or pre-threaded film supporting device, as shown in FIGURE 3, comprises basically a support 122 including a flat base member 124, a film drive means 126 mounted on the base member 124, a film gate means 128 mounted on the base member 124, and a film guide means 130 mounted on the base member 124, the film guide means including a pair of spaced guides 132 and 134. Still further, the pre-threaded film supporting device includes a bracket means or unit 136 for coupling the film supply 12 with the support 122, a film locking means 138 cooperating with the film gate means 128 to lock film therein, and a drive locking means 140 cooperating with the drive means 126 to lock the same in a given position.

While the various means discussed immediately above and carried by and forming part of the pre-threaded film supporting device constructed in accordance with the preferred embodiment hereof, are cooperatively assembled, and work in a unitary fashion to provide a desired result, the particular operation and function of each means, as well as the preferred structural arrangement thereof, can be better understood by consideration of each means generally independently. Thus, each means is initially discussed separately below.

(B) *Film supply means*

The film supply means 12 as indicated toward the outset of this detailed description, can take various forms, but preferably takes the form of an endless film magazine constructed in accordance with the teachings of my aforesaid prior application Serial No. 95,974. Such a magazine includes a turntable 142 adapted to be drivingly connected with a spindle such as that indicated by the numeral 96 and shown in FIGURE 2, which turntable serves to support a coil of film. A film housing 144 is mounted by a suitable hub means (not shown) in overlying relation to the turntable. The film housing has a top cover plate 146 with a slot 148 therein adjacent the center portion thereof. Further, the cover plate has a down-turned marginal skirt or flange 150 with an opening 152 therein. In such an arrangement, as described in my aforesaid prior application, film is led outwardly from the center slot 148 and returns inwardly through the opening 152. The cover plate preferably has associated therewith a film guide means includes adjustable film guides depending from the adjustment handles 154 and 156 shown in FIGURE 3 hereof.

Although the construction of the endless film magazine is only generally described in the preceding paragraph, it is believed that the construction thereof will be readily apparent from such description to those of ordinary skill in the art. Should further details be required, however, then reference can be made to my aforesaid prior co-pending application. For purposes of the present invention, it is sufficient to understand that the apparatus provided hereby is adapted to be used with an endless film magazine, but that other film supply means can be used. In any event, the film supply means has a film loop extending therefrom, and preferably is in such form that it can readily be associated with or on, or suitably coupled to, the support 122 of the pre-threaded film supporting device.

(C) *Bracket unit*

Regardless of the particular form of film supply means, if the same is adapted to be operatively supported in a horizontal position, then the invention provides a bracket means for coupling the same with the base member 124 of support 122, such bracket means being generally designated by the numeral 136, as indicated above.

The preferred detailed construction of such bracket unit is shown particularly in FIGURES 10, 11 and 12. By referring to these figures, it will be noted that the bracket means 136 includes an arm means 158 projecting upwardly from the base member 124 in generally parallel relation thereto. Extending perpendicularly from the arm 158, as shown in FIGURES 10 and 11 is a track means 160 comprising a channel member 162 having arcuate slots 164 and 166 in opposed spaced side walls 168 and 170 thereof. The track means 160 further includes guide flanges 172 and 174 which extend generally parallel to and below the slots 164 and 166 outwardly in projecting relation to the side walls 168 and 170. The flanges 172 and 174, however, as shown in FIGURES 10 and 11, terminate short of the ends of the slots 164 and 166 remote from the arm 158. Specifically, the flanges 172 and 174 extend generally along and below the slots 164 and 166 from the inner end thereof adjacent the arm 158 toward the outer end thereof. The flanges, however, terminate in space relation to the outer end of the slots 164 and 166. A carriage means 176 is movable on the track means 160 from a first position, as shown in FIGURE 10, where the carriage means extends at least generally perpendicular to the arm 158, to a second position, as shown in FIGURE 11, where the carriage means extends at least generally parallel to the arm 158. Connected to and depending from the carriage means 176 is a bracket 178 which serves to connect the film supply 12, or specifically the cover plate portion 146 thereof, with the carriage means for movement therewith, the cover plate extending in each instance in generally parallel relation to the carriage means 176. With this arrangement, as shown in FIGURES 10 and 11, the film supply is movable from a horizontal position to a generally vertical position, or in particular from a position extending transverse to the arm 158 to a position extending generally parallel thereto.

The carriage means 176 preferably includes a base 180 comprising a pair of base members 182 and 184 having pin collars 186 and 188 projecting upwardly therefrom, and a pin 190 fixed in each of the collars 186 and 188 and extending through the slots 164 and 166 respectively. Further, the carriage includes bearing means supported in depending relation to each of the base members 182 and 184 for supporting the same on the flanges 172 and 174. The bearing means, in essence, serve as wheels whereby the base members are movable simultaneously, through the coupling therebetween provided by the pin 190, over the flanges 172 and 174 from the position shown in FIGURE 10 to the position shown in FIGURE 11. The cooperation of the pin 190 with the slots 164 and 166 serves cooperatively with the flanges to guide the carriage during the major portion of the movement between the respective positions referred to, but when the cariage approaches the outer end of the track means 160, that is when the pin 190 approaches the outer end of the slots 164 and 166, then the respective base members 182 and 184 are no longer supported by the flanges 172 and 174 and accordingly, the carriage is permitted to turn downwardly, and assume the position shown in FIGURE 11.

Preferably, a biasing means, in the form of a spring such as that designated by numeral 194, is connected between the carriage means 180 or specifically, the bracket block 196 supported on the pin 190 and the arm 158, or inner end of the channel member 162, whereby the carriage means is urged normally into the position shown in FIGURE 10. With this arrangement, if the carriage means is not held in the position shown in FIGURE 11, then the same automatically, under the action of the spring 194, returns to the position shown in FIGURE 10, the position shown in FIGURE 10 being the operative position.

As should be evident, when a bracket means 136 constructed as described above is used, the film supply is movable in association with the support 122 from the position thereof shown in FIGURE 3, to the position thereof shown in FIGURE 5. Specifically, in FIGURE 3, the film supply is shown as being horizontally disposed, whereas in FIGURE 5, the film supply is shown as being generally vertically disposed or folded over and extending generally parallel to the support 122. As should be also apparent, for purposes of shipment, storage, and transportation, it is desirable to maintain the film supply in the position shown in FIGURE 5. However, as indicated above, the carriage is biased toward the position which it assumes as shown in FIGURE 5.

(D) *Latching means for maintaining film supply in folded position*

To maintain the film supply in folded position, the pre-threaded film supporting device includes a latching means generally designated by the numeral 200. The particular construction of such latching means is best shown in FIGURES 13 and 14. By referring to these figures, it will be seen that the latching means comprises a generally hollow collar member 202 having a closed base portion 204, preferably with an aperture 206 extending therethrough. The aperture 206 can, for example, be aligned with a corresponding aperture 210 in the base member 124, and a bolt 208 can be passed through the aligned apertures 206 and 210, with a nut 212 threadably engaging the inner end of bolt 208 to maintain the collar member 202 in fixed position on the base member 124. However, any other suitable coupling can be used here.

Slidably received within the collar member 202 is a plunger 214 biased upwardly by means of a compression coil spring 216. The upper end of the collar member 202 has a pivot pin 218 extending thereacross, and pivotally coupled on the pin 218 is a latching member 220. The latching member 220 has an elongate latching arm portion 222 terminating in a latching head 224 at one end, and terminating in a transversely extending foot 226 at the opposite end thereof. With this arrangement, the latching arm 220 is movable from a released position as shown in FIGURE 14, to the latching position shown in FIGURE 13. In the released position, the foot 226 compresses the spring 216 through the pressure applied thereto by the intermediary plunger 214. In the operative position of the latching arm, foot 226 is engaged with plunger 214. Thus, the latching member is stably positioned when disposed as shown in FIGURE 14, as well as when disposed as shown in FIGURE 13.

Now, associating the latching means 200 with the film supply 12, it will be noted from FIGURE 5, that the latching means 200 is disposed on base member 124 in a position adjacent the lower periphery 146' of the cover plate 146 of the film supply when the film supply 12 is folded over as shown in FIGURE 5. Thus, with the film supply folded over, the latching arm 220 can be moved to the operative position thereof to thereby maintain the latching head 224 in engagement with the cover plate 146 (see FIGURE 13). Alternatively, the latching arm 220 can be folded down as shown in FIGURES 3 and 14 so as to be positioned in an inoperative and non-interfering position.

To reiterate, the bracket means 136 serves to couple the film supply 12 to the support 122 whereby the film supply is movable from a position extending generally transverse to the support 122 to a position extending generally parallel to such support. In the transverse position of the film supply, the support thereof is achieved through the carriage means 176, and cooperation thereof with the track means 160. In the folded position of the film supply, the carriage and trackway support one edge portion of the film supply, and the latching means 200 engages another edge portion of the film supply spaced from the bracket means to maintain the film supply in the folded position.

(E) Input rollers and feed path

Regardless of the particular form of film supply, and manner in which the same is coupled with the support 122, or base member 124, the film supply has a length of film or film loop extending therefrom. This film loop or length of film includes that portion entering the pre-threaded film supporting device, in the embodiment shown, over the roller 230 and the portion of film returning to the film supply from the pre-threaded film supporting device over the roller 240. The rollers 230 and 240 are suitably maintained in position on base member 124, or specifically, on the upper extending portion 124a thereof by a bracket 232 having arms 234 and 236 respectively extending inwardly and generally diagonally from the base member 124. A bearing shaft screw 238 rotatably supports the roller 230 on the arm 234, and a corresponding bearing shaft screw 242 rotatably supports the roller 240 on the arm 236. The rollers 230 and 240 are thus disposed to properly train the film in position without damage thereto notwithstanding folding movement of the film supply 12.

The length of film 14 entering the pre-threaded film supporting device encounters initially the film drive means 126, and then encounters successively the film gate means 128 and the film guide means 130, before again engaging the film drive means 126.

(F) Film drive means of pre-threaded film support means

As best shown in FIGURE 9, the film drive means 126 comprises a drive sprocket 250 and means including a plurality of cooperating rollers 252, 254, 256 and 258, for maintaining spaced portions of the film loop in engagement with spaced portions of the sprocket 250. Specifically, film entering the pre-threaded film supporting device first engages the upper portion of sprocket 250. The film apertures (see FIGURE 15) mate with the teeth on the sprocket, and the film is held in position on the sprocket by respective rollers 252 and 254. The length of film returning from the guide means 130, as shown in FIGURE 3, however, again encounters the drive means 126, and specifically the sprocket 250. The returning length of film is shown in FIGURE 9 as engaging the lower portion of sprocket 250, the film being maintained in engagement with such portion and the teeth there located by the respective rollers 256 and 258.

Since the sprocket 250 engages spaced portions of the film loop or length of film, in the manner explained above, there is maintained between the respective portions of the film engaged by the sprocket a pre-determined length of film. This pre-determined length of film forms the loop which, as shown in FIGURES 3 and 5, extends through the film gate means 128 and the film guide means 130. In other words, the double engagement of the film by the sprocket, in the manner explained above, fixes a given length of film traveling through the pre-threaded film supporting device between the point at which the film initially engages the sprocket as it enters the device, and the point at which the film again engages the sprocket as it leaves the device. The double engagement of the film with sprocket 250 maintains this relation since the upper portion of the sprocket drives the film forwardly whereas the lower portion of the sprocket drives the film rearwardly, both drives being inherently at the same rate. This double engagement is particularly important, because as explained more fully below, this affords one control over the relative positioning of the film between a light projecting means a sound reproducing means for proper synchronization of visual display and sound presentation.

Now, again returning to the detailed construction of the drive means carried by and forming part of the pre-threaded film supporting device, reference is again made to FIGURE 9. It will be noted from this figure that the sprocket 250 is floatingly supported between the respective rollers 252, 254, 256, and 258. The term "floatingly supported" means that the sprocket is mounted on a slightly undersized diameter stub shaft so that the sprocket itself is free to move through a limited angular motion relatively to the shaft, but is normally maintained in perpendicular alignment to the shaft by means of the supporting rollers 252, 254, 256 and 258. The rollers 252, 254, and 256 are journaled on stub shafts 260, 264 and 266 respectively. The stub shafts have one end fixed to the base member 124, and preferably project at their other end past the respective rollers, the projecting ends of such shafts being receivable in the bearing sockets 40, 42 and 44 respectively provided on a projection apparatus, such as shown in FIGURE 2.

The remaining roller 258 is journaled on a shaft 266 supported by a pair of cooperating links 268 and 270. This link 268 extends from a pivotal mounting collar 272 pivoted on a stub shaft 274 having one end fixed to the base member 124, and having its opposite end projecting beyond the link for reception in a bearing socket such as that designated by the numeral 46 in FIGURE 2. The link 268 thus basically pivotally mounts the shaft 266, and thereby the roller 258. The link 270 on the other hand, is effectively a biasing link and to this end, a spring 280 is coupled between the outer end of the link 270 and a fixed post 282 projecting on base member 124. The base member is provided with a slot 284 therein through which the shaft 266 is movable. With the biasing arrangement shown, the spring 280 tends to force the link 270 clockwise as shown in FIGURE 9, thereby causing the shaft 266 to move to the left as shown and to engage the left end of the slot 284. The roller 258, is by this means, generally self-adjustable whereby the same can respond to and move with variations in pressure thereon caused by film returning to the underside of the sprocket 250.

(G) Drive locking means

As indicated above, a drive locking means 140 is provided to maintain the drive means 126 in a fixed position. By again referring to FIGURE 9, it will be noted that the drive locking means includes a locking arm 300 having one end portion 302 thereof forked to engage with and lock the sprocket 250 from rotation. The locking arm 300, as best shown in FIGURE 4, is mounted in a support member 304 having a slideway 306 therein. The slideway 306 is preferably of dove-tail configuration in transverse, cross-section and the portion of the arm 300 movable in the slideway, at least, has a corresponding configuration whereby the arm 300, as mounted within the slideway 306, is reciprocable toward and away from the sprocket 250. To normally bias the arm 300 toward its locking position, a biasing means 308, including a pair of springs 310 and 312, is coupled between the arm 300, which in effect is a slide, and support member 304. One end of each of the springs 310 and 312 is directly connected to the arm 300 by a pin 314 and the other end of each of the springs is connected to the support member 304, as by pins 316 and 318.

The outer end of the arm 300 is generally bent upwardly as an elbow 320 thereby forming a cam portion 322 on the arm 300. Disposed in overlying relation to the cam portion 320 of the arm 300 is an opening 324 in the base member 124. When the arm 300 is in its locking position, i.e., when the end 302 thereof is engaging the sprocket 250, then, as shown in FIGURE 5, the cam portion 322 of the arm 320 has its inner or upper edge underlying the opening 324 whereby, if a suitably sized shaft was passed through the opening 324, the same would engage the camming portion 322, thereby urging the arm 300 to the right as shown in FIGURE 5, or specifically to a position where the forked inner end 302 thereof was free of engagement with the sprocket 250.

As explained more fully below, the opening 324, is so disposed as to be aligned with the stub shaft member 114 shown in FIGURE 2 when the pre-threaded film support is operatively associated with the projection apparatus. In other words, the disposition of the aperture or opening 324 is such that, when the pre-threaded film supporting device is coupled to the projection apparatus as shown in FIGURE 1, the stub shaft member 114 passes through the opening 324 engaging the cam portion 322 of the arm 300 as it enters the opening, and thereby moving the arm 300 to its released position free of engagement with the sprocket 250. Alternatively, as long as no shaft member passes through the opening 324, the locking arm 300 remains in engagement with the sprocket thereby fixing the same in a given position.

(H) *Film gate means*

Now, as indicated above, the film passing into the pre-threaded film supporting device initially encounters the sprocket 250, and then passes to the film gate means 128. Such gate means is best shown in FIGURES 15 through 18.

By referring to FIGURE 15, it will be noted that the film 14 is shown as passing through the film gate means 128, and as having conventional spaced apertures 15 in one edge portion thereof. The visual media is carried on the film as a series of frames 17 in the conventional manner. The film gate means 128, as also conventional, has a window 336 therein corresponding in size to respective equally dimensioned frames 17 on the film 14. In basic aspect, the film gate means 128 serves to support the film 14 in advance of the light projecting means, and with frames 17 thereof aligned with the window 336 whereby a single frame only is projected from the ultimate apparatus assembly.

The film gate means 128 as shown, includes a base member 330 having an upstanding side wall portion 340 extending along one side edge thereof. Pivotally coupled to the upstanding side wall portion 340 in any suitable and conventional manner is a film gate door 332. The pivotal coupling is exemplarily shown at 346 in FIGURE 17, but since pivotal couplings for film gate doors are conventional, merely an illustrative showing has been presented. In any event, it will be noted from FIGURES 17 and 18 that the door 332 extends in spaced parallel relation to the base member 330. The door 332 is biased toward its closed position as shown in FIGURES 15, 17 and 18 by a biasing member 338 having arms 339 and 341 extending from opposite ends thereof and sloping into engagement with the door 332.

The biasing member 338 is flotably mounted at the upper end of the side wall portion 340 by means of bolts 342 extending through suitable apertures in the biasing member 338 and threadably mounted on the upper end of wall portion 340. Springs 344 and 345 are maintained between the enlarged heads of the bolts 342 and the topside of the biasing member 338 thereby pressing the same downwardly, and in turn pressing the door 332 into its closed position.

Carried on the base member 330 along the side thereof opposite the upstanding sidewall portion 340 is an end member 348 adapted to mate with the right edge, as shown, of the door 332, and further adapted to support the projecting door handle 334 extending over the member 348. In this manner, the member 348 supports the door in proper spaced parallel relation to the base member 330. Further, underlying the member 348 is a spacer block 350 having an inner edge 352 which defines one longitudinal edge of a channel 354 within the gate means 128. The opposed edge of the channel 354 is defined by the inner lower edge of upstanding side wall portion 340, namely, the edge 356. Thus, between the edges 356 and 352, and in overlying relation to the base member 330, there is a channel through which the film 14 can pass.

The base member 330 has an enlarged opening 360 therein underlying the window 336 and the channel so that light from the light projecting means can pass through the base member, then through the film 14, and then through the window 336. Moreover, the opening 360 is dimensioned whereby the film advancing claw 20, shown in FIGURE 2 and referred to above, can enter within the film gate means, and engage the apertures 15 in the edge portion of the film, as required for conventional motion picture projector operation.

Since various film gate means are well known in the motion picture projector art, further discussion of the particular gate means incorporated in and supported on the pre-threaded film support device hereof is believed unnecessary. However, it is important to understand that the film gate means 128 is fixed on base member 124 of support 122 in a position such that the film gate means is located immediately in advance of the light projection means 8 and specifically, immediately in advance of the housing 22 thereof, when the pre-threaded film support is operatively coupled on the projection apparatus as shown in FIGURE 1. The gate means is thus located so that the film passes along an axis such as that designated by the numeral 100 in FIGURE 2, and is engageable by a film advancing claw such as that designated by the numeral 20. Further, it is important to understand that the film gate means has an opening therein for permitting the film advancing claw to enter the film gate means and engage the film, as required.

(I) *Locking means for fixing film in gate means*

Now, again referring to FIGURES 17 and 18, it will be noted that a finger member 370 is illustratively shown therein as being movable through an opening 372 in the door 332. The finger 370, in fact, is so disposed, as is the opening 372, that the finger passes into the path of the apertures 15 carried along one edge portion of the film. The finger 370 is carried at the outer end of an operating arm or lever member 374. The construction and operation of such operating arm, and of the finger 370 can be best understood, bearing in mind the foregoing factors, by further references to FIGURES 7 and 8.

In FIGURE 7, the operating arm 374 is shown in the position which it assumes when the finger 370 is in the position shown in FIGURE 17. In FIGURE 8, on the other hand, the operating arm 374 is shown in the position which it assumes when the finger 370 is in the position shown in FIGURE 18. Specifically, the arm 374 is movable from a first position where the finger 370 carried thereby is in engagement with the film (FIG- URES 7 and 17), to a second position where the finger carried thereby is free of engagement with the film (FIGURES 8 and 18).

The arm 374 has projecting therefrom a coupling link or arm extension 376, and the arm 374 and link 376 are fixed together. Moreover, the link 376 is pivotally mounted on a pivot shaft 378 fixed to the support member 124 whereby the coupling link 376 is movable from the position shown in FIGURE 7 to the position shown in FIGURE 8, thereby causing movement of the operating arm 374 between the respective positions shown in such figures. In order to normally bias the operating arm 374 to the position shown in FIGURE 7 where the finger 370 projecting from one end thereof is in engagement with the film, there is provided a biasing means in the form of a spring 380, such spring having one end thereof coupled by a pin 382 to the link 376, and having the other end thereof coupled to the support or base member 124 as by a pin 384. With the coupling as shown, the link 376 is biased counter-clockwise, as shown in FIGURE 7, thereby urging the operating arm and finger 370 carried thereby to the right, as shown in such figure.

The link 376 has an elbow shaped outer end portion 386 which in essence is a cam portion. Disposed in overlying relation to the inner edge 388 of such cam portion is an opening or aperture 390 in the base member 124. The opening 390 is positioned to overlie the cam edge 388 when the link is in the position shown in FIGURE 7, but when the link has been moved to the position shown in FIGURE 8, the edge 388 is adjacent the juxtaposed edge of the opening 390, the operating arm 374 having then been sufficiently moved to release the finger 370 from engagement with the film.

Now, just as the opening 322 was positioned whereby the stub shaft member 114 could engage the cam portion 320 of the arm 300 for releasing the drive means, the opening 390 is positioned so that when the pre-threaded film supporting device is in operative position on the projection apparatus, the stub shaft member 112 passes through the opening 390, thereby engaging the link 376 and causing the same to pivot clockwise, as shown in FIGURE 7, or specifically thereby causing the link 376 to pivot to a position which causes the operating arm 374 to move the finger 370 from an engaging position with the film.

The finger 370, operating arm 374, link 376, and spring 384, as mounted in the manner described above, thus effectively serve as a convenient locking means for releasably locking the film within the film gate means when the pre-threaded film support device is not operatively coupled to the projection apparatus.

It should here be noted that with the provision of the film locking means 138, with the provision of the sprocket or drive locking means 140, and with the engagement of the film by the sprocket, the loop of film between the sprocket and the film gate means on opposite sides of the film gate means is maintained at a constant length. Specifically, the length of film between the upper side of the sprocket and the film gate means is of a predetermined length, and the length of film between the film gate means and the under side of the sprocket is also of a predetermined length. The film is thus fixed in a predetermined path, and this fixing is of particular importance because it permits, through the use of the film guide means described below, automatic synchronization of the visual display with the sound reproduction when the pre-threaded film support device is operatively associated with a projection apparatus.

(J) *Film guide means*

Now, referring in more detail to the film guide means, as indicated above, the same includes two spaced guides, 132 and 134, each of such guides in essence comprising a roller, each roller being designated respectively by numerals 400 and 402. Means are provided for movably supporting each of the guide rollers 400 and 402, but the means provided in this regard, according to the preferred embodiment, differ from one another.

The means supporting the guide roller 402 for movement, preferably, as shown, comprises a pivoted arm member 404 having the base portion thereof pivotally mounted on the base member 124 by a pivot shaft 405. Preferably, a spacing collar 408 is disposed between the base member 124 and the arm member 404 whereby the arm member is pivotal in a plane extending in spaced parallel relation to the base member 124. To normally bias the arm member 404 clockwise as shown in FIGURE 3, there is incorporated a leaf spring 410 having one end fixed to the arm 404, and having the other end fixed to the base member 124.

The arm member 404 has projecting therefrom an operating arm or operating finger 406, the finger 406 extending through a slot 408 in the base member 124. The arrangement of the operating arm or finger 406 is such that the same projects to the opposite side of the base member 124 from that on which the arm 404 and other operating means are disposed. The operating arm or finger member 406 serves a dual function, namely, it abuts opposite ends of the slot 408 to limit movement of the arm member 404 and the guide roller 402 carried thereby, and furthermore, as explained more fully below, it serves as a means for moving the operating arm 404 to an operative position when desired.

While the guide roller 402 as rotatably mounted by the shaft 412 on the arm 404 is pivotally movable between positions, the guide roller 404, to the contrary, is reciprocally movable between positions. The movable mounting for the roller 400 utilized in accordance with the preferred embodiment hereof can be best understood by referring to FIGURE 4. Specifically, it will be noted that a support member 420 is fixed on the base member 124, the support member 420 having a slideway 422 therein, preferably of dovetail configuration. Reciprocally mounted in the slideway 422 is a slide 424, such slide being an elongate member having a configuration corresponding to that of the slideway 422 whereby the slide is reciprocable in the slideway. The upper end of the slide carries a pin shaft 426 on which the guide roller 400 is rotatably mounted. Thus, with reciprocal movement of the slide 422, the roller 400 is correspondingly reciprocated. For purposes of normally biasing the guide roller 400 downwardly, there is provided a biasing means 428 including a pair of springs 430 and 432, opposite ends of the springs being connected respectively to the slide as by a pin 436, and to the support member 420 as by the pins 438 and 440. This slide and slideway construction, as well as the biasing means therefor, generally corresponds to that used for mounting the movable element of the sound reproducing means, and for mounting the locking arm of the drive locking means. Accordingly, further detailed discussion of this particular arrangement appears unnecessary.

Again referring to FIGURE 3, it is important to understand that the guide rollers 400 and 402, as biased by the respective biasing means affecting movement thereof, are normally disposed so as to maintain the portion 14x of film freely suspended therebetween in a position to be inserted between the separable elements of the sound reproducing means shown in FIGURE 2. Both guide rollers 400 and 402 are disposed in spaced relation to base member 124 by the mountings therefore so as to maintain the portion of film therebetween not only properly vertically positioned but also properly horizontally positioned. If desired, a further roller guide can be provided to extend diagonally to the right of the roller 400 and slide 424 as shown in FIGURE 4. Such further roller as shown in FIGURE 4, engages the film between the film gate means and the roller 400 to maintain the portion of the film loop extending therebetween in proper position and free of opening 423 in base member. However, such additional or further roller is not essential.

(K) *Aligning means and openings*

The pre-threaded film supporting device, in addition to having thereon the elements discussed in detail above, and the openings therein discussed above, has certain further cooperating aligning means and openings. Specifically, the pre-threaded film supporting device has a group of aligning sockets 502, 504 and 506 disposed generally peripherally thereof and adapted respectively to receive the aligning coupling pins 106, 108 and 110 from a projection apparatus such as shown in FIGURE 2. The opening 423 permits the housing 22 of the light projecting means to extend through the base member 124. Furthermore, the base member 124 is provided with additional slots 510 and 512 through which the respective operating arm members or operating fingers 68 and 92 extending from the projection apparatus, as described above, are adapted to pass so as to be movable therein. Even further, in this latter regard, it should be noted from FIGURE 4 that the slide 424 carries thereon a laterally projecting arm 520 disposed in the path of the slot 510. The arm 520 is positioned to overlie the pin 68 projecting from the slide 56 and to engage abutment 64 of the means 50 movably supporting the element 48 of the sound reproducing means.

Even further, and in addition to the above, it is to be noted that the pre-threaded film supporting device has a generally flat member 540 projecting laterally from one side thereof in parallel inwardly spaced relation to the base member 124, the member 540 extending specifically from a peripherally disposed inwardly extending skirt 125 integral with the base member 124 (FIGURE 6). The member 540 as shown has an aperture 542 therein and a slot 544 opening onto the aperture 542. The aperture 542 and slot 544 are dimensioned to receive the shaft 102 and aligning projection or pin 104, which project from the face 20 of apparatus 4, as shown in FIGURE 2.

COOPERATIVE ASSEMBLY

From the preceding discussion, it should be appreciated that after the projection apparatus has been modified in accordance herewith, and after the pre-threaded film supporting device has been constructed in accordance herewith, the same are ready for cooperative detachable association or coupling in releasable relation to one another. To this end, the pre-threaded film supporting device has already been threaded with film 14 in a predetermined path determined by the particular projecting apparatus with which it is to be used. The film supply 12, if not already moved to operative position, is initially moved to operative position, with release of the latching means 200, if required, and if necessary, with the manual aid of the handle 147 provided on the cover plate 146. Aside from the film supply, the other elements of the pre-threaded film supporting device are then in the position shown in FIGURE 5.

The pre-threaded film supporting device is then gripped by the handle 580 projecting from the outer face thereof and also by a suitable edge, if necessary, and moved into juxtaposition to the projecting apparatus 4 as shown in FIGURE 2. The operating handle member 70 is in its released position as shown, and if necessary, the shaft 102 has been moved to a position where the alignment projection or pin 104 extending therefrom is directed vertically upward. As the pre-threaded supporting device is moved into coupling relation to the projecting apparatus 4, the shaft 102 enters the aperture 542, and the pin 104 thereon enters the slot 544. As shown in FIGURE 6(A), this cooperative reception of the shaft 102 and pin 104 within the member 540 can only be achieved if the pin 104 is in its upright position. If the pin is not in the upright position, it will not pass through the slot, and this will mean, as explained above, that the film advancing claw 20 is not in a retracted position. When the pin 104 is in its upright position, however, the film advancing claw is in its retracted position, and the member 104 is free to pass through the slot 544 as the shaft 102 passes through the aperture 542. FIGURE 6(B) shows such passage during the initial coupling, and FIGURE 6(C) shows the disposition of the member 540 after the pre-threaded film supporting device has been fixed in its operating position on the projection apparatus 4.

Now, assuming the alignment pin 104 was in its proper position, and assuming the member 540 is being moved over the shaft 102 without interference, then as the pre-threaded film supporting device is moved into position on the projection apparatus, the alignment coupling pins 106, 108 and 110 enter the respective aligning sockets 502, 504 and 506 carried on the base member 124 thereby maintaining the pre-threaded film supporting device in predetermined alignment with the projection apparatus 4. By virtue of this alignment, the stub shaft members 112 and 114 enter the openings 390 and 322 respectively thereby moving the respective operating arms 374 and 300 of the film-locking means and drive locking means respectively to release the film within the gate means 128 and to release the sprocket 250 for rotation. The sprocket 250, as will be noted by reference to FIGURE 4, has recesses 251 on the inner face thereof, which recesses are at this time receiving the projecting teeth on the bevel gear 32 so that while the sprocket is released by the locking means therefor, the same is engaged by the drive connection 18 for drive of the sprocket means and thereby the film on the pre-threaded film supporting device.

Simultaneously with the above operation, the projecting operating arm or finger 68 extending from the movable mounting for sound reproducing element 48 passes through the slot 510 of the base member 124 in underlying relation to the projecting arm 520 extending from the slide 424 mounting the guide roller 400. Also simultaneously, the operating arm or finger member 92 extending from the projection apparatus passes through the slot 512 in base member 124.

As a result of the above, and the respective lengths of the operating arms or fingers 68, 92 and 406, the outer end portions of each of these operating arms or finger members are disposed in a common plane extending parallel to and overlying both the base member 124 and the face 20 of the projection apparatus. Specifically, these operating arms or fingers extend through the common plane in which the operating handle member 70 is movable. Now, by virtue of the alignment recited above, during the insertion of the pre-threaded film supporting device on the projection apparatus, the portion 14x of the film extending between the guide rollers 400 and 402 enters the space between the sound reproducing elements 46 and 48. Thus, the film is so located that the sound reproducing elements can be closed in engaging relationship to the film.

Accordingly, after the pre-threaded film supporting device has been releasably coupled to the projection apparatus as described above, the operating handle member 70 can be moved from the position shown in FIGURE 2 to the position shown in FIGURE 1. As this movement takes place, the elbow 71 in the operating handle member 70 engages the projecting operating arm or finger member 68 thereby raising the slide 56 and moving the sound reproducing element 48 into cooperative relation to the sound reproducing element 46. Simultaneously, the slide 424 is moved upwardly, by virtue of the cooperative engagement between the arm 520 extending therefrom with the abutment 66 on slide 56. Also, as the operating handle member 70 moves to the position shown in FIGURE 1, it engages the operating arm or finger member 406 projecting from the pivotal mounting arm 404 for the roller guide 402. This results in moving the roller 402 generally upwardly. With upward movement of the roller 402 and upward movement of the roller 400 with closing movement of the sound reproducing element 48 toward the sound reproducing element 46, the respective roller members or roller guides are positioned to properly direct the film in non-binding relation through the sound reproducing means, as closed. The aforesaid movements take place with the initial movement of the operating handle member 70, and toward the end of the travel of the operating handle member 70 toward the position shown in FIGURE 1, the same engages the operating arm or finger member 92 thereby moving the same upwardly and activating the drive means of the projection apparatus. As noted above, simultaneously with this movement, the spindle 96 is moved upwardly to cooperatively associate with the film 15 supply 12 which has, at this time, been positioned in overlying relation to the spindle 96 and extending within the recess 116. Proper alignment of the film supply has, of course, been achieved by virtue of the other alignment recited previously. With such alignment, moreover, the film 14 passing through the film gate means has been positioned for engagement by the advancing claw 20. The assembly is, therefore, immediately operative upon final latching of handle member 70 in its operative position by the latching means 76. The handle member 70, furthermore extends across base member 124 thereby maintaining the pre-threaded film supporting device in position.

Once the film on the pre-threaded supporting device has been run to the extent desired, the operator merely releases the operating handle from the latching means 76, and removes the pre-threaded film supporting device, the removal automatically causing the film and drive locking means to assume their locking positions to maintain the film in a pre-set path for re-use as desired.

If another presentation is then to be made, another pre-threaded film supporting device, constructed as described above, is coupled on the projection apparatus in the same manner as explained and the new film is automatically presented upon returning the operating handle to its operating position.

After reading the foregoing detailed description of the illustrative and preferred embodiments of the present invention, it should be apparent that the objects set forth at the outset of the present specification have been successfully achieved. Accordingly, what is claimed is:

1. In a projection apparatus having a light projecting means, the improvement comprising:
   film support means;
   means for selectively detachably coupling said film support means to said projection apparatus in a predetermined position;
   film supply means carried by said film support means;
   said film supply means including a film loop extending therefrom;
   cooperating drive means on said projection apparatus and said film support means;
   said cooperating drive means including a sprocket on said film support means and cooperating roller means for maintaining spaced portions of said film loop in engagement with spaced portions of said sprocket; and
   said cooperating drive means further including driving mechanism on said projection apparatus and extending therefrom for engagement with said sprocket when said film support means is coupled to said projection apparatus in said predetermined position;
   said film loop including a continuous free portion projecting forwardly of those spaced portions engaged with said sprocket; and
   guide means on said film support means for controlling the position of free portion of said film loop;
   said guide means including a film gate means spaced from said sprocket with said free portion passing therethrough;
   said film gate means being disposed in advance of said light projecting means when said film support means is mounted in said predetermined position whereby light from said light projecting means will be directed to said free portion passing through said film gate means;
   said guide means further including a pair of spaced apart guide mechanisms, said pair being interposed between said sprocket and said film gate means to engage and properly position a section of free portion between said sprocket and said film gate means;
   one of said pair of guide mechanisms including first and second roll means through which said free portion passes, said first roll means being spring biased and movable reciprocably between an inoperative position spaced away from said second roll and an operative position whereat said free portion is clamped between said first and second rolls;
   the other of said guide mechanisms including a pivotally mounted arm having a roller thereon in engagement with said free portion.
   said pivotally mounted arm being spring biased and movable toward and away from said first and second roll means to thereby properly adjust and position that section of said free portion between said arm roller and said first and second roll means.

2. The improvement defined in claim 1 wherein said projection apparatus has a driven film advancing claw thereon movable between retracted and advancing positions, wherein said guide means maintains said free portion of said film loop in the path of movement of said claw when said support means is coupled to said projection apparatus in said predetermined position, and further including cooperating means on said support means and said projection apparatus for preventing initial coupling of said support means to said projection apparatus in said predetermined position unless said film advancing claw is in a retracted position.

3. The improvement defined in claim 1 wherein said projection apparatus has a positioning element projecting therefrom, and wherein locking means are provided for releasably locking said film of said free portion in said film gate means, said locking means having a movable operating means for releasing said film for travel through said gate means, said operating means being disposed for engagement with said positioning element for automatic movement of said operating means to release said film when said support means is in said predetermined position.

4. The improvement defined in claim 3 wherein said projection apparatus has another positioning element projecting therefrom, and further including locking means for releasably fixing said sprocket means in a given position, said locking means having a movable operating means for releasing said sprocket means from said given position, said operating means being disposed for engagement with said another positioning element for automatic movement of said operating means to release said sprocket means when said support means is in said predetermined position.

5. In combination:
   (a) a projection apparatus having a driven film advancing claw exposed on one face thereof and movable between retracted and advancing positions;
   (b) a pre-threaded film supporting device;
   (c) means for detachably coupling said supporting device to said projection apparatus in a predetermined position overlying said face of said projection apparatus;
   (d) said film supporting device having guide means thereon for maintaining a film loop in a path for automatic operative positioning of said loop with respect to said projection apparatus and with said film in the path of movement of said film advancing claw; and
   (e) cooperating means on said film supporting device and said projection apparatus for preventing initial coupling of said supporting device to said projection apparatus in said predetermined position unless said film advancing claw is in a retracted position;

(f) said projection device including a housing, drive means mounted in said housing, said film advancing claw being driven by said drive means;

(g) said cooperating means including a shaft member projecting from said housing, means mounting said housing for rotation, means coupling said shaft member to said drive means for rotation of said shaft member synchronously with movement of said claw;

(h) said shaft member having an alignment guide projecting radially thereof, and alignment means carried on said supporting device and movable over said shaft member and past said alignment guide when said supporting device is in said predetermined position only if said alignment guide is in a predetermined position corresponding to a retracted position of said film advancing claw.

6. The combination defined in claim 5 wherein said alignment means comprises a generally flat member having an aperture therein dimensioned to freely receive said shaft therethrough, and a slot opening onto said aperture and dimensioned to receive said alignment guide therethrough.

References Cited by the Examiner

UNITED STATES PATENTS

| | | | |
|---|---|---|---|
| 1,887,664 | 11/1932 | Stechbart | 242—55.19 |
| 1,935,572 | 11/1933 | Leventhal | 352—83 |
| 2,026,960 | 1/1936 | Branch | 352—83 X |
| 2,126,341 | 8/1938 | Nagel | 352—221 |
| 2,203,032 | 6/1940 | Spence | 352—128 X |
| 2,226,363 | 12/1940 | Williams | 352—72 |
| 2,238,719 | 4/1941 | Tartas | 352—72 |
| 2,449,705 | 9/1948 | Jones | 352—29 |
| 2,464,965 | 3/1949 | Chemel | 242—55.19 |
| 2,521,150 | 9/1950 | Chemel | 352—34 |
| 2,624,232 | 1/1953 | Kingston | 352—83 |
| 2,781,689 | 2/1957 | Heyer | 242—55.01 |
| 2,880,993 | 4/1959 | Harries et al. | 242—55.19 |

FOREIGN PATENTS 244,709    5/1963    Australia.

NORTON ANSHER, Primary Examiner.

WILLIAM MISIEK, Examiner.